United States Patent
Kwak et al.

(10) Patent No.: US 7,824,819 B2
(45) Date of Patent: Nov. 2, 2010

(54) MEMBRANE-ELECTRODE ASSEMBLY FOR MIXED REACTANT FUEL CELL AND MIXED REACTANT FUEL CELL SYSTEM INCLUDING THE SAME

(75) Inventors: Chan Kwak, Suwon-si (KR); Alexey Alexandrovichserov, Suwon-si (KR); Jun-Won Suh, Suwon-si (KR); Won-Hyouk Jang, Suwon-si (KR); Si-Hyun Lee, Suwon-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 752 days.

(21) Appl. No.: 11/705,827

(22) Filed: Feb. 14, 2007

(65) Prior Publication Data

US 2007/0224487 A1 Sep. 27, 2007

(30) Foreign Application Priority Data

Feb. 17, 2006 (KR) .................. 10-2006-0015643

(51) Int. Cl.
*H01M 8/02* (2006.01)
*H01M 8/10* (2006.01)
*H01M 4/86* (2006.01)
(52) U.S. Cl. .................. 429/483; 429/512; 429/523
(58) Field of Classification Search .................. 429/30, 429/32, 38, 39, 44
See application file for complete search history.

(56) References Cited

U.S. PATENT DOCUMENTS

| 4,855,092 A * | 8/1989 | Fukuda et al. | 429/44 X |
| 6,794,077 B2 * | 9/2004 | Yi et al. | 429/38 X |
| 6,808,838 B1 * | 10/2004 | Wilson | 429/30 X |
| 6,969,563 B1 * | 11/2005 | McLean | 429/38 X |
| 2007/0042237 A1 * | 2/2007 | Sorkin et al. | 429/17 |

FOREIGN PATENT DOCUMENTS

| KR | 10-2005-0058292 | 6/2005 |
| WO | WO2004/093232 | 10/2004 |

* cited by examiner

*Primary Examiner*—Stephen J. Kalafut
(74) *Attorney, Agent, or Firm*—Robert E. Bushnell, Esq.

(57) ABSTRACT

A membrane-electrode assembly for a mixed reactant fuel cell system is provided. The membrane-electrode assembly does not require a separator that physically separates the membrane-electrode assemblies from each other in a stack. The membrane-electrode assembly of the present invention instead includes an electrode substrate that is disposed on a surface of an anode or a cathode of the membrane-electrode assembly. The electrode substrate has a flow path, through which a fuel and an oxidant are supplied. The fuel and oxidant are absorbed into the electrode substrate and further into the anode and the cathode. The fuel and the oxidant are selectively oxidized and reduced in the anode and the cathode, respectively, to produce electricity.

16 Claims, 5 Drawing Sheets

MEMBRANE-ELECTRODE ASSEMBLY FOR MIXED REACTANT FUEL CELL AND MIXED REACTANT FUEL CELL SYSTEM INCLUDING THE SAME

CLAIM OF PRIORITY

This application makes reference to, incorporates the same herein, and claims all benefits accruing under 35 U.S.C. §119 from an application for MEMBRANE-ELECTRODE ASSEMBLY FOR MIXED REACTANT FUEL CELL AND MIXED REACTANT FUEL CELL SYSTEM COMPRISING SAME earlier filed in the Korean Intellectual Property Office on the 17$^{th}$ of Feb. 2006 and there duly assigned Serial No. 10-2006-0015643.

BACKGROUND OF THE INVENTION

1. Field of the Invention

The present invention relates to a membrane-electrode assembly for a mixed reactant fuel cell and a mixed reactant fuel cell system including the same. More particularly, the present invention relates to a membrane-electrode assembly for a mixed reactant fuel cell that can smoothly and evenly supply a fuel and an oxidant into catalyst layers of the membrane-electrode assembly, and a mixed reactant fuel cell system including the same.

2. Description of the Related Art

A fuel cell is a power generation system for producing electrical energy through an electro-chemical redox reaction of an oxidant and hydrogen that is contained in a hydrocarbon-based material such as methanol, ethanol, or natural gas.

Types of fuel cells include a polymer electrolyte membrane fuel cell (PEMFC) and a direct oxidation fuel cell (DOFC). The direct oxidation type fuel cell includes a direct methanol fuel cell that uses methanol for a fuel.

The polymer electrolyte fuel cell has an advantage of high energy density, but it also has disadvantages of carefully handling of hydrogen gas and the requirement of accessory facilities such as a fuel reforming processor for reforming a fuel such as methane, methanol, natural gas, and the like in order to produce hydrogen from the fuel.

A direct oxidation fuel cell has a lower energy density than the polymer electrolyte fuel cell, but it has advantages of easy handling of a fuel, being capable of operating at a room temperature due to its low operation temperature, and no need for additional fuel reforming processors.

SUMMARY OF THE INVENTION

One embodiment of the present invention provides a membrane-electrode assembly for a mixed reactant fuel cell that can provide a fuel and an oxidant into catalyst layers of an anode and a cathode smoothly and evenly. Another embodiment of the present invention provides a mixed reactant fuel cell system including the membrane-electrode assembly.

According to an embodiment of the present invention, a membrane-electrode assembly for a mixed reactant fuel cell system includes an electrode substrate having a flow path inside the electrode substrate, a first electrode formed on the electrode substrate, a polymer electrolyte membrane formed on the first electrode, and a second electrode formed on the polymer electrolyte membrane.

The flow path of the electrode substrate can have a pattern such as a stripe pattern or a reticular pattern. The flow path has a cross-sectional area ranging about 0.2 mm$^2$ to about 20 mm$^2$, preferably ranging about 0.5 mm$^2$ to about 10 mm$^2$, and more preferably ranging about 1 mm$^2$ to about 3 mm$^2$. The volume of the flow path is between about 0.05 volume % and about 0.15 volume % based on the total volume of the electrode substrate.

The electrode substrate can be carbon paper, carbon cloth, carbon felt, metal cloth, or combinations thereof.

According to another embodiment of the present invention, a mixed reactant fuel cell system includes a stack including at least one membrane-electrode assembly, a fuel supplier for supplying a fuel, an oxidant supplier for supplying an oxidant, and a reactant mixing device coupled to each of the stack, the fuel supplier, and the oxidant supplier.

The membrane-electrode assembly includes an electrode substrate having a flow path inside the electrode substrate, a first electrode formed on the electrode substrate, a polymer electrolyte membrane formed on the first electrode, and a second electrode formed on the polymer electrolyte membrane.

The reactant mixing device mixes together the fuel supplied from the fuel supplier and the oxidant supplied from the oxidant supplier. The reactant mixing device supplies the mixture of the fuel and the oxidant to the stack.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
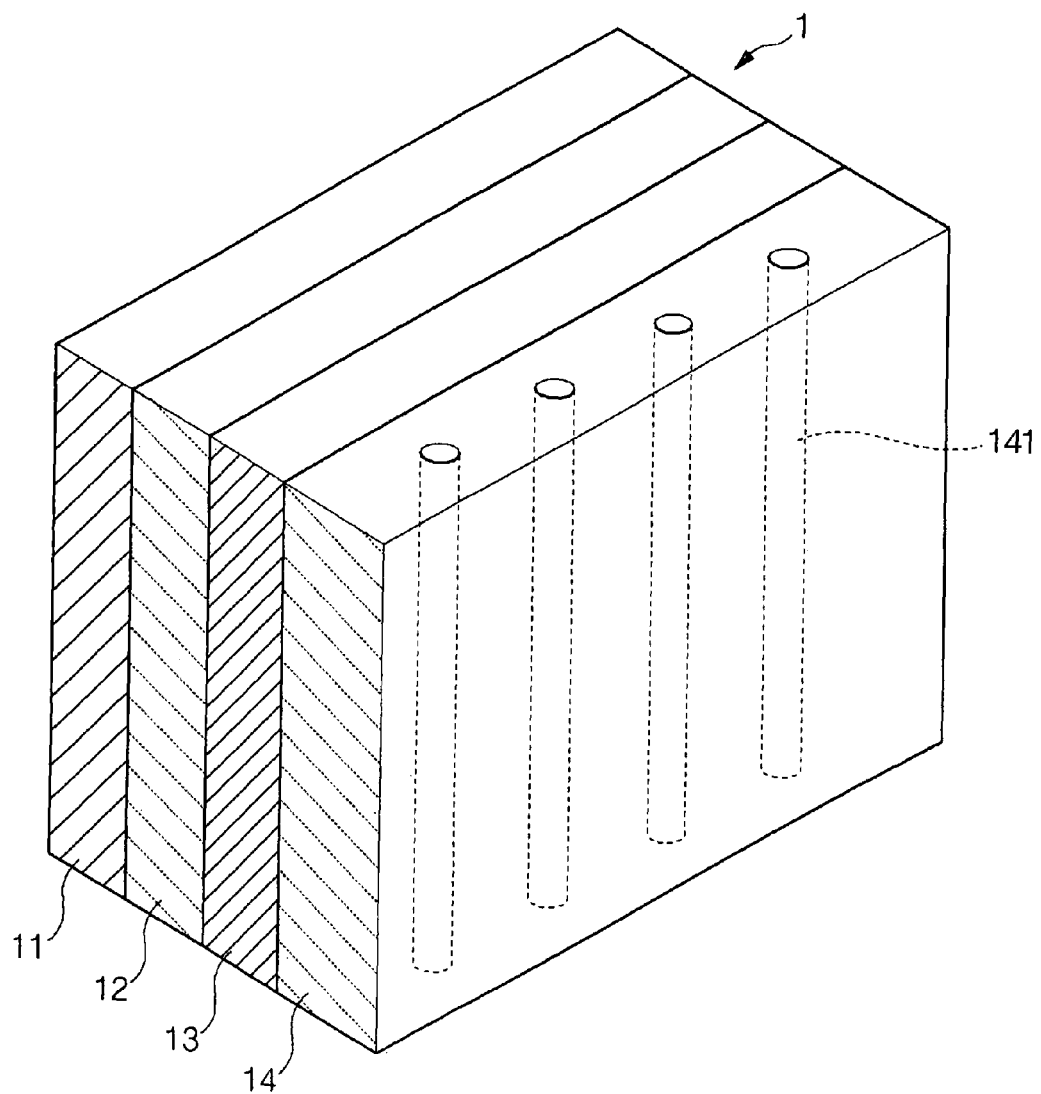
FIG. 1 is a perspective view of a membrane-electrode assembly for a mixed reactant fuel cell constructed as one embodiment of the present invention.

An exemplary embodiment of the present invention will hereinafter be described in detail with reference to the accompanying drawings.

A fuel cell is a power generation system producing an electrical energy from an oxidation reaction of a fuel and a reduction reaction of an oxidant. It generally includes a fuel supplier, a stack, and an oxidant supplier.

The stack is a part that generates electrical energy using a fuel and an oxidant supplied from a fuel supplier and an oxidant supplier, respectively. It is generally composed of several membrane-electrode assemblies with a separator disposed between them. The membrane-electrode assembly includes an anode and a cathode, and further includes a polymer electrolyte membrane that transfers protons, which are generated in the anode, to the cathode. The separator supplies the fuel and the oxidant to the anode and the cathode, respectively, for the reaction in the fuel cell, and physically separates the membrane-electrode assemblies from each other.

In a fuel cell system, a fuel is injected into an anode, and an oxidant is injected to a cathode. If the fuel or oxidant is supplied to the other electrode, performance of fuel cells deteriorates. Therefore, the separator is required to prevent the fuel and the oxidant from flowing into other electrodes.

A mixed reactant fuel cell, however, includes different types of catalysts. An anode of the mixed reactant fuel cell includes a catalyst that selectively activates an oxidation reaction of a fuel. A cathode of the mixed reactant fuel cell includes another catalyst that selectively activates the reduction reaction of the oxidant. Thereby, when a mixture of the fuel and the oxidant is injected into both of the anode and the cathode, only an oxidation reaction of the fuel is carried out in the anode, and only a reduction reaction of the oxidant is carried out in the cathode.

Therefore, the mixed reactant fuel cell of the present invention does not require separators which are necessary to isolate each membrane-electrode assembly in non-mixed reactant type fuel cell. The crossover of the fuel and oxidant is not an issue in the mixed reactant fuel cell. Therefore, the mixed reactant fuel cell can remarkably reduce production cost for a fuel cell, and can be manufactured in a smaller size.

In a fuel cell system, whenever a fuel and an oxidant are supplied to a stack, the fuel and oxidant are evenly distributed into an anode and a cathode, respectively, through flow channels formed in separators. In the mixed reactant fuel cell, because separators are not present, a new element is necessary to evenly distribute the fuel and oxidant into an anode and a cathode.

The present invention relates to a membrane-electrode assembly for a mixed reactant fuel cell in which a fuel and an oxidant are smoothly and uniformly supplied over an electrode substrate, without adding separate equipments but by changing a structure of an electrode substrate.

The membrane-electrode assembly for a fuel cell of the present invention includes a polymer electrolyte membrane, an anode positioned at one side of the polymer electrolyte membrane, a cathode positioned at the other side of the polymer electrolyte membrane, and an electrode substrate positioned at one side of the anode or the cathode.

In one embodiment, the electrode substrate is formed from a material such as carbon paper, carbon cloth, or carbon felt, or a metal cloth such as a porous film composed of metal fiber or a metal film disposed on a surface of a cloth composed of polymer fibers. The electrode substrate, however, is not limited thereto.

The electrode substrate further includes a flow path through which a fuel and an oxidant can flow. The fuel and oxidant are absorbed into the electrode substrate through a wall of the flow path formed inside the electrode substrate. In this mechanism, a fuel and an oxidant can be smoothly supplied inside an electrode substrate, and then uniformly spread over the electrode substrate. In addition, a flow path works as a barrier wall to prevent protons, which should move toward the polymer electrolyte membrane, from directly moving toward the other electrode (a cathode) positioned next to the electrode substrate.

The flow path can be formed inside the electrode substrate in any shape or pattern, as long as the flow path can uniformly supply a fuel and an oxidant into the electrode substrate. Accordingly, the flow path can be formed in various patterns, for example, a stripe pattern, a reticular pattern, and the like. Furthermore, a method of fabricating the flow path has no particular limit if the flow path can be formed in an electrode substrate. For example, the flow path can be formed by the use of a laser beam.

The flow path also can have various cross-sectional shape. A cross-section of a path, herein, is defined as a part cut off perpendicular to the direction of the path. The size or area of the cross-section of the flow path does not need to be uniformly maintained. The area of the cross-section, however, can be in a range of approximately $0.2$ $mm^2$ to $20$ $mm^2$. According to another embodiment of the present invention, the area of the cross-section can be in a range of approximately $0.5$ $mm^2$ to $10$ $mm^2$, but according to still another embodiment, the area of the cross-section can be in a range of approximately $1$ $mm^2$ to $3$ $mm^2$. If the area of the cross-section of the flow path is greater than $20$ $mm^2$, a fuel and an oxidant flow through the flow path so fast that absorption of the fuel and the oxidant into the wall of the electrode substrate becomes difficult. On the other hand, if the area of the cross-section of the flow path is less than $0.2$ $mm^2$, a fuel and an oxidant may not smoothly flow through the flow path.

In addition, the volume of the flow path can be 0.05 volume % to 0.15 volume % based on the total volume of an electrode substrate.

The electrode substrate is positioned on a surface of the anode or the cathode, and diffuses a fuel and an oxidant to a catalyst layer of the anode or the cathode. Whenever a plurality of membrane-electrode assemblies are stacked to form a stack, the electrode substrate of a membrane-electrode assembly contacts an anode or a cathode of the next membrane-electrode assembly. Therefore regardless whether the electrode substrate is positioned on a surface of an anode or a cathode, the electrode substrate is positioned between an anode and a cathode. In this case, the first or the last membrane-electrode assembly of the stack may have an electrode substrate at both surface of the membrane-electrode assembly. Therefore, the stack of the membrane-electrode assemblies forms a complete circuit.

Accordingly, a fuel and an oxidant can be supplied to an electrode substrate through a flow path formed in the electrode substrate, and can be uniformly absorbed into a catalyst layers of an anode and a cathode. Electric-chemical reactions are generated in catalyst layers of an anode and a cathode. Because the anode includes a catalyst that selectively reacts to the oxidation reaction of the fuel, and the cathode includes a catalyst that selectively reacts to the reduction reaction of the oxidant, only an oxidation reaction of the fuel is taken place in the anode, and only a reduction reaction of the oxidant is taken place in the cathode.

Platinum-ruthenium can be used for the catalyst of the anode, and RuS/C, RuSe/C, Fe—N/C, or Co—N/C, where transition metal bound with nitrogen is dispersed on a carbon carrier, can be used for the catalyst of the cathode.

The polymer electrolyte membrane transfers protons produced from an anode catalyst layer to a cathode catalyst layer, and is made of a high proton conductive polymer.

The proton conductive polymer can be a polymer resin having at its side chain a cation exchange group such as a sulfonic acid group, a carboxylic acid group, a phosphoric acid group, a phosphonic acid group, or derivatives thereof. Examples of the polymer resin include one proton conductive polymers such as fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, or polyphenylquinoxaline-based polymers. Examples of the proton conductive polymer also includes a material such as poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly (2,5-benzimidazole). The thickness of the polymer electrolyte membrane ranges from 10 μm to 200 μm.

FIG. 1 is a perspective view of a membrane-electrode assembly for a mixed reactant fuel cell constructed as one embodiment of the present invention. Membrane-electrode assembly 1 includes cathode 13, anode 11 facing cathode 13, and polymer electrolyte membrane 12 that is disposed between anode 11 and cathode 13. Electrode substrate 14 is positioned on a surface of cathode 13. In the present embodiment, electrode substrate 14 is illustrated to be positioned on a surface of cathode 13, but when several membrane-electrode assemblies are stacked to form a stack, anode 11 contacts another electrode substrate of another membrane-electrode assembly that is positioned next to membrane-electrode assembly 1. Therefore, an electrode substrate is disposed between a cathode (of one membrane-electrode assembly) and an anode (of another membrane-electrode assembly). The first or the last membrane-electrode 11 assembly of the stack has an electrode substrate at each surface of an anode and a cathode. Even though FIG. 1 shows only one electrode substrate 14 positioned on a surface of cathode 13, it is assumed in the description hereafter that another electrode substrate is also positioned on a surface of anode 11, which will be clear when referring to FIG. 2. Each of anode 11 and cathode 13 also can be referred to as a first electrode or a second electrode.

In membrane-electrode assembly 1, a fuel and an oxidant are supplied through flow path 141 formed inside electrode substrate 14. The fuel and the oxidant are absorbed into electrode substrate 14 through the wall of flow path 141, and are diffused over electrode substrate 14. The fuel and oxidant absorbed in electrode substrate 14 are subsequently absorbed in anode 11 and cathode 13. The fuel is oxidized at anode 11, generating protons and electrons. The protons pass through polymer electrolyte membrane 12, and are transferred to cathode 13. The electrons are transferred to cathode 13 through an external circuit (not shown) of membrane-electrode assembly 1, outputting electrical energy. Protons and electrons transferred to cathode 13 are combined with oxidant of cathode 13, and generate water through a reduction reaction of the oxidant.

Figure 2:
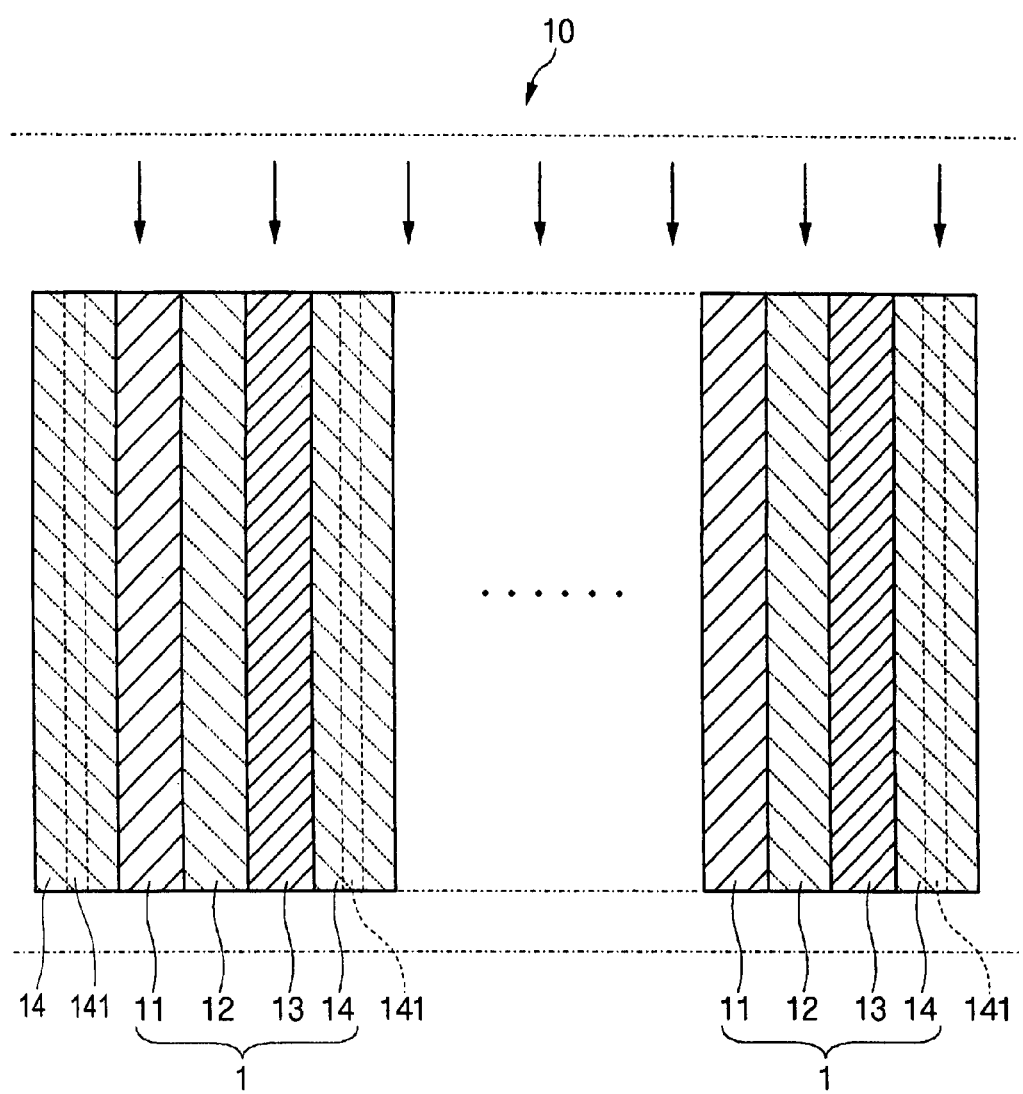
FIG. 2 is a cross-sectional view of a stack of the membrane-electrode assembly shown in FIG. 1 to schematically illustrate inflows of a fuel and an oxidant to the electrode substrate of the membrane-electrode assembly in the stack that is constructed as the embodiment of the present invention.

FIG. 2 is a cross-sectional view of a stack of the membrane-electrode assemblies, one of which is illustrated in FIG. 1, to schematically illustrate inflows of a fuel and an oxidant to the electrode substrate of the membrane-electrode assembly in the stack. When a fuel and an oxidant are supplied in a direction represented by arrows, the fuel and the oxidant can flow through an inlet (not shown) of flow path 141, and are diffused into electrode substrate 14, and further into anode 11 and cathode 13. Stack 10 can be designed in a manner that the fuel and the oxidant can flow only through the inlet of the flow path 141, or can directly flow through interfaces between electrode substrate 14 and anode 11, and between electrode substrate 14 and cathode 13.

Figure 3:
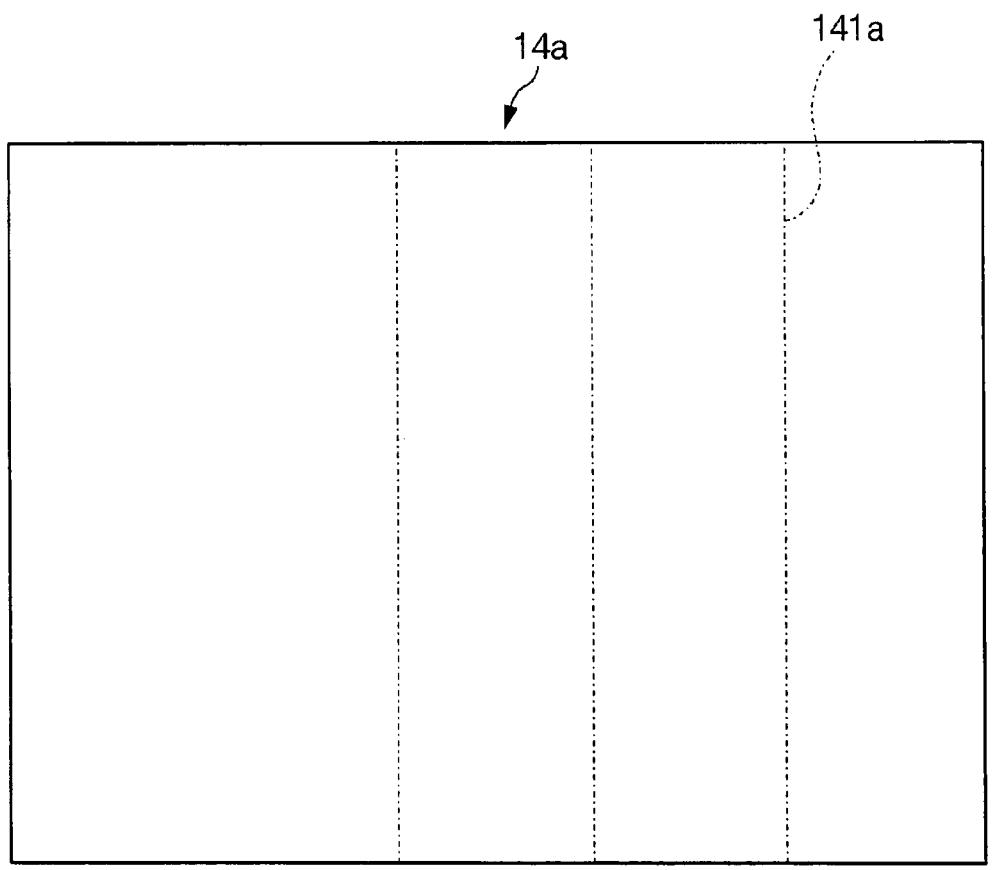
FIG. 3 schematically shows the electrode substrate in which flow path is formed in a stripe pattern.
Figure 4:
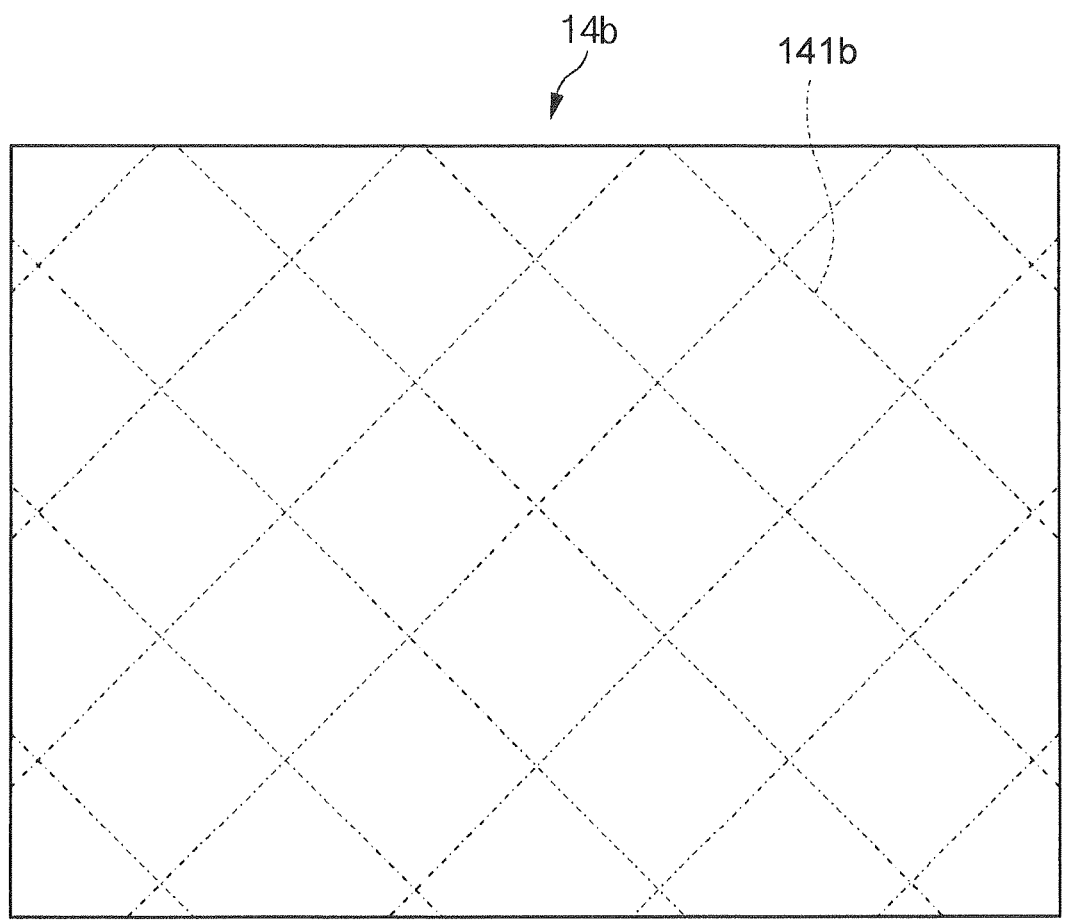
FIG. 4 schematically shows the electrode substrate in which flow path is formed in a reticular pattern.

FIG. 3 is a schismatic view of the electrode substrate of the membrane-electrode assembly shown in FIG. 1. In FIG. 3, the dash dotted lines schematically illustrate flow paths 141a formed inside electrode substrate 14a. FIG. 3 shows electrode substrate 14a, inside which flow paths 141a are formed in a stripe pattern, in which flow paths 141a are arranged in a form of stripes. FIG. 4 shows electrode substrate 14b, inside which flow paths 141b are formed in a reticular pattern, in which flow paths 141b are formed in a net-like arrangement.

The present invention further provides a mixed reactant fuel cell system, which includes a stack including a membrane-electrode assembly, a fuel supplier, and an oxidant supplier. The stack includes at least one membrane-electrode assembly described referring to FIG. 1. The membrane-electrode assembly generates electricity through fuel oxidation and oxidant reduction reactions. Therefore, the stack including a plurality of membrane-electrode assemblies can generate higher electrical power than a single membrane-electrode assembly. The fuel supplier supplies a fuel to the stack, and the oxidant supplier supplies an oxidant to the stack. The fuel includes liquid or gaseous hydrogen, or a hydrocarbon-based fuel such as methanol, ethanol, propanol, butanol, or natural gas. The membrane-electrode assembly can be effectively used for a direct oxidation fuel cell using a hydrocarbon fuel. Accordingly, hydrocarbon fuel may be suitable. The oxidant is generally oxygen, and can be supplied from an oxygen supplier or from air.

According to the embodiment of the present invention, a mixed reactant fuel cell system can be applied to a polymer electrolyte membrane fuel cell (PEMFC) and a direct oxidation fuel cell (DOFC). Particularly, a mixed reactant fuel cell system can be applied to a direct methanol fuel cell (DMFC).

Figure 5:
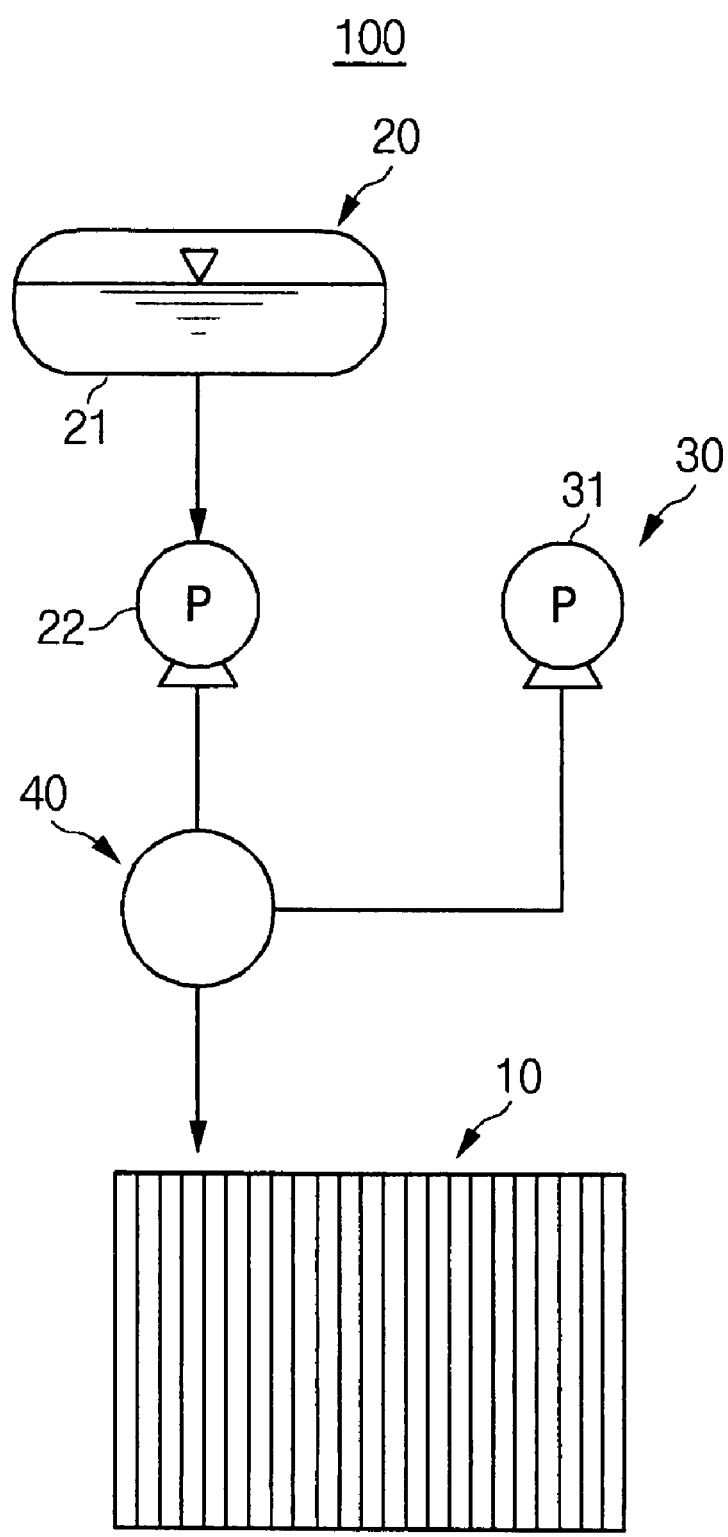
FIG. 5 is a schematic view showing a mixed reactant fuel cell system constructed as an embodiment of the present invention.

FIG. 5 is a schematic view showing a mixed reactant fuel cell system constructed as an embodiment of the present invention. FIG. 5 illustrates a fuel cell system in which a fuel and an oxidant are provided to stack 10 through fuel pump 22 and oxidant pump 31, respectively, but the present invention is not limited to this structures. The fuel cell system of the present invention can include a structure in which a fuel and an oxidant are provided in a diffusion manner.

Mixed reactant fuel cell system 100 includes stack 10 including at least one membrane-electrode assembly, fuel supplier 20 for providing stack 10 with a fuel, and oxidant supplier 30 for providing stack 10 with an oxidant. In addition, fuel supplier 20 includes tank 21 that stores fuel, and fuel pump 22 that supplies the fuel stored in tank 21 with a predetermined pumping power. Oxidant supplier 30, which supplies an oxidant to stack 10, includes at least one oxidant pump 31 for supplying an oxidant with a predetermined pumping power.

Mixed reactant fuel cell system 100 of one embodiment of the present invention can include reactant mixing device 40. Reactant mixing device 40 mixes the oxidant supplied from oxidant supplier 30 with the fuel supplied from fuel supplier 20, and injects the mixture of the fuel and the oxidant into stack 10.

Stack 10 includes at least one membrane-electrode assembly which generates electricity through fuel oxidation and oxidant reduction reactions. The fuel and oxidant are supplied from reactant mixing device 40 to catalyst layers of an anode and a cathodes of a membrane-electrode assembly through the electrode substrates of the membrane-electrode assembly. At the catalyst layer of the anode, fuel is oxidized to generate protons and electrons through fuel oxidation reactions. The protons are transferred to a cathode catalyst layer through a polymer electrolyte membrane that is disposed between the anode and the cathode. The electrons are transferred to the cathode through an external circuit. At the catalyst layer of the cathode, the transferred protons and electrons are reacted with an oxidant to generate water. The membrane-electrode assembly generates electricity through the above reactions.

The following examples illustrate the present invention in more detail. However, it is understood that the present invention is not limited by these examples.

EXAMPLE 1

Five stripe-shaped flow paths with a cross-sectional area of 1 mm$^2$ were formed inside a first carbon paper electrode substrate by the use of a laser beam. The surface area of the carbon paper electrode substrate was 10 cm$^2$. A first catalyst slurry was prepared by mixing 13.9 g of RuSe/C, 4.2 g of a polyperfluorosulfonate binder, and 7.1 ml of a mixed solvent of isopropyl alcohol and water (a mixing volume ratio of isopropyl alcohol to water=9:1). The prepared first catalyst slurry was formed on a surface of the carbon paper electrode substrate to fabricate a cathode for a fuel cell.

A second carbon paper electrode substrate, which had the same structure and size as the first carbon paper electrode substrate, was prepared. A second catalyst slurry was prepared by mixing platinum-ruthenium black, a polyperfluorosulfonate binder, and a mixed solvent of isopropyl alcohol and water. The second carbon paper electrode substrate was coated with the second catalyst slurry to form an anode for the fuel cell.

The anode is disposed on one surface of a NAFION (perfluorosulfonic acid) polymer electrolyte membrane, and the cathode on the opposite surface of the polymer electrolyte membrane. The stack of the anode, the polymer electrolyte membrane, and the cathode is hot-pressed at 200° C. for 3 minutes with pressure of 200 kgf/cm$^2$, fabricating a membrane-electrode assembly.

The fabricated membrane-electrode assembly was interposed between glass fiber gaskets coated with polytetrafluoroethylene, and also between copper ends, to make a unit fuel cell.

EXAMPLE 2

A unit fuel cell was prepared in the same method as described in Example 1 except that each of the flow paths of the first and second carbon paper electrode substrates has a cross-sectional area of 5 mm$^2$.

COMPARATIVE EXAMPLE 1

A unit fuel cell was prepared in the same method as described in Example 1 except that each of the first and second carbon paper electrode substrates has no flow path.

Power density was measured for each of the unit fuel cells made in Example 1, Example 2, and Comparative Example 1. From the results of the power density measurement, it was found that unit fuel cells of Examples 1 and 2 have much about 45% higher power density than the unit fuel cell of Comparative Example 1.

Because a membrane-electrode assembly for a mixed reactant fuel cell of the present invention can smoothly supply a fuel and an oxidant inside an electrode substrate, and the fuel and oxidant can uniformly spread over the electrode substrate, the membrane-electrode assembly of the present invention can improve performance of the fuel cell.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A membrane-electrode assembly for a mixed reactant fuel cell system comprising:
    an electrode substrate having a flow path inside the electrode substrate, both of a fuel and an oxidant being supplied through the flow path;
    a first electrode formed on the electrode substrate;
    a polymer electrolyte membrane formed on the first electrode; and
    a second electrode formed on the polymer electrolyte membrane.

2. The membrane-electrode assembly of claim 1, comprised of the flow path having a pattern selected from the group consisting of a stripe pattern and a reticular pattern.

3. The membrane-electrode assembly of claim 1, comprised of the flow path having a cross-sectional area ranging about 0.2 mm$^2$ to about 20 mm$^2$.

4. The membrane-electrode assembly of claim 3, comprised of the flow path having a cross-sectional area ranging about 0.5 mm$^2$ to about 10 mm$^2$.

5. The membrane-electrode assembly of claim 4, comprised of the flow path having a cross-sectional area ranging about 1 mm$^2$ to about 3 mm$^2$.

6. The membrane-electrode assembly of claim 1, wherein the volume of the flow path is between about 0.05 volume % and about 0.15 volume % based on the total volume of the electrode substrate.

7. The membrane-electrode assembly of claim 1, comprised of the electrode substrate being selected from the group consisting of carbon paper, carbon cloth, carbon felt, metal cloth, and combinations thereof.

8. A mixed reactant fuel cell system comprising:
    a stack including at least one membrane-electrode assembly, the membrane-electrode assembly comprising:
        an electrode substrate having a flow path inside the electrode substrate;
        a first electrode formed on the electrode substrate;
        a polymer electrolyte membrane formed on the first electrode; and
        a second electrode formed on the polymer electrolyte membrane;
    a fuel supplier for supplying a fuel;
    an oxidant supplier for supplying an oxidant; and
    a reactant mixing device coupled to each of the stack, the fuel supplier, and the oxidant supplier; the reactant mixing device mixing together the fuel supplied from the fuel supplier and the oxidant supplied from the oxidant supplier; the reactant mixing device supplying the mixture of the fuel and the oxidant to the stack.

9. A mixed reactant fuel cell system of claim 8, comprised of the flow path having a pattern selected from the group consisting of a stripe pattern and a reticular pattern.

10. A mixed reactant fuel cell system of claim 8, comprised of the flow path having a cross-sectional area ranging about 0.2 mm$^2$ to about 20 mm$^2$.

11. A mixed reactant fuel cell system of claim 10, comprised of the flow path having a cross-sectional area ranging about 0.5 mm$^2$ to about 10 mm$^2$.

12. A mixed reactant fuel cell system of claim 11, comprised of the flow path having a cross-sectional area ranging about 1 mm$^2$ to about 3 mm$^2$.

13. A mixed reactant fuel cell system of claim 8, wherein the volume of the flow path is between about 0.05 volume % and about 0.15 volume % based on the total volume of the electrode substrate.

14. The mixed reactant fuel cell system of claim 8, comprised of the electrode substrate being selected from the group consisting of carbon paper, carbon cloth, carbon felt, metal cloth, and combinations thereof.

15. The mixed reactant fuel cell system of claim 8, comprised of the mixed reactant fuel cell including a direct oxidation fuel cell.

16. The mixed reactant fuel cell system of claim 8, comprised of the mixed reactant fuel cell including a direct methanol fuel cell.

* * * * *